Sept. 8, 1964     G. C. SZEGO     3,148,037
REPEATING CHEMICAL REACTOR APPARATUS
Original Filed Aug. 9, 1957     2 Sheets-Sheet 2
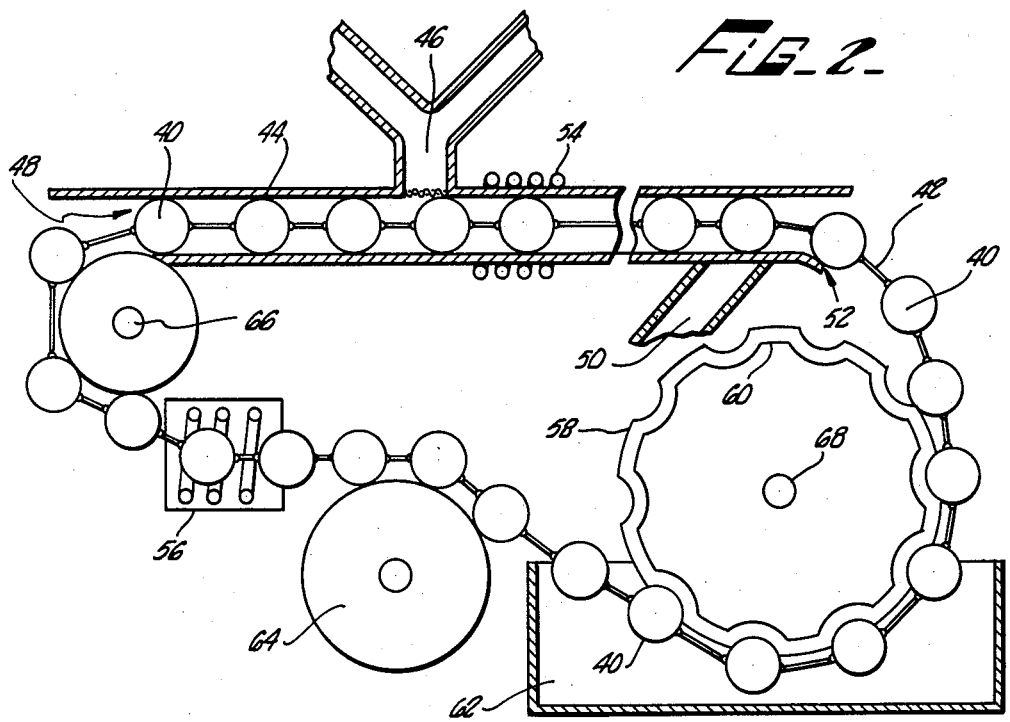
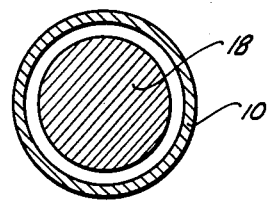
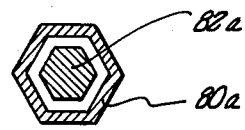
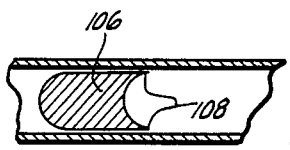
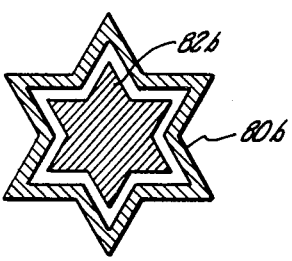
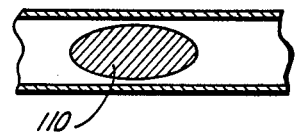
INVENTOR.
GEORGE C. SZEGO
BY
ATTORNEYS.

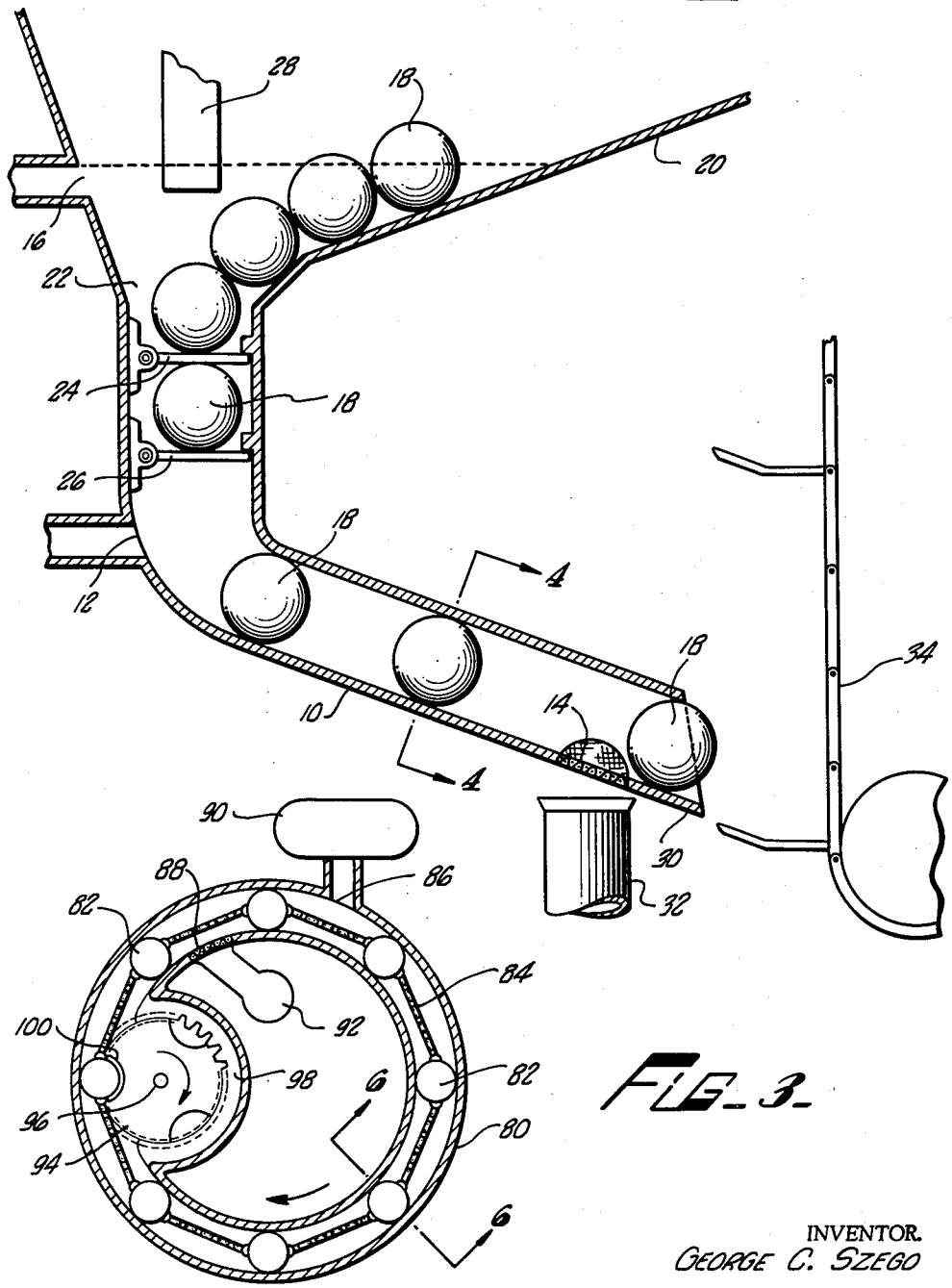

United States Patent Office 3,148,037
Patented Sept. 8, 1964

3,148,037
REPEATING CHEMICAL REACTOR APPARATUS
George C. Szego, P.O. Box 90482, Los Angeles, Calif.
Original application Aug. 9, 1957, Ser. No. 677,306.
Divided and this application Jan. 2, 1962, Ser. No. 163,499
1 Claim. (Cl. 23—288)

The present invention relates to apparatus and method for conducting chemical reactions.

This application is a division of my copending application Serial No. 677,306, filed August 9, 1957, now abandoned.

Chemical reactions, considered in the broadest sense, are carried out batch-wise in stirred kettles or continuously in reactor vessels; in the latter case the reactant materials are continuously introduced and the contents of the vessel are continuously withdrawn at appropriate rates. In industrial chemical practice continuous reaction equipment assures a more homogeneous product and makes numerous economies of labor and handling possible. However, the yields of chemical reactions carried out in continuous reactors on a industrial scale are frequently substantially below those anticipated from laboratory data, which for the most part, are based on individual batch reactions. This difference in yields which is often as high as fifty percent is due to improper mixing of the reacting chemicals in continuous reaction equipment through short circuiting of parts of the fluid stream. It is well known and a demonstrable fact, that some of the reagents introduced into a continuous flow chemical reaction chamber pass quickly through the reactor before reacting as theoretically predicted and that other portions of the fluid in the reactor containing the maximum concentration of yield products remain in the reaction chamber for extended periods. In a tubular reaction chamber, this adverse situation is manifested as longitudinal mixing; however increased lateral mixing in a tubular reactor brings the reagents into more intimate contact and therewith improves the yield of reaction products. Hence, in tubular reactors it is important that lateral mixing be maximized, but longitudinal mixing, excepting within short lengths of the tube, be minimized.

Another difficulty encountered in chemical reactors is the formation of fouling deposits on the reactor walls. This is partially overcome by employing scraping stirrers, dilution of the reagents within the chamber, by reducing the operating temperatures, or by passing the reagents through tubular reaction chambers, as is done in the petroleum industry, at very high velocities. All of these procedures aimed at controlling fouling deposits tend to lessen yields of reaction products.

In many industrial exothermic chemical reactions very close, localized control of the temperature of the reagents and reaction products must be maintained to avoid undesired side reactions which waste the reactants and create separation problems in the recovery of the yield products. This is especially true in the polymerization reactions. In endothermic reactions heat must be supplied locally to the reagents and a sufficiently high temperature maintained throughout the reaction vessel to cause the reaction to go forward at a reasonably rapid rate. In either case localized heating or cooling must be avoided, rather than merely having the bulk temperature under control.

One object of my invention is to provide a chemical reactor having better characteristics than individual batch mixing reactors and at the same time providing continuous flow feed and drain.

Another object of my invention is to provide a chemical reactor having localized temperature control over the reactants during the reaction process.

Another object of my invention is to provide a tubular chemical reactor wherein there is a maximum of lateral mixing of the reactants and a minimum of longitudinal fluid turbulence.

Another object of my invention is to provide a chemical reaction which is self cleaning of fouling deposits on the walls of the reaction chamber.

Still another object of my invention is to provide a tubular chemical reactor wherein catalyst materials may be introduced into the reactor and transported along with the flow of the reactants.

A still further object of the present invention is to provide a method of carrying out chemical reactions in an elongated reactor wherein there is a maximum of lateral mixing of the reactants and a minimum of longitudinal turbulence.

These and other advantages and objects of my invention will be apparent from the drawings, specification and claim below.

Preferred embodiments of apparatus for carrying out the novel methods of the present invention are illustrated in the accompanying figures wherein:

FIG. 1 is a cross section view of a first embodiment of my chemical reaction chamber wherein the plugs are free bodies;

FIG. 2 is a cross sectional view partly fragmented of a second embodiment of my invention wherein the plugs are moved by a continuous cable;

FIG. 3 is a cross sectional view of a third embodiment of my invention especially adaptable for reactions requiring high temperature and high pressure; the plugs are in this embodiment connected by sections of chain;

FIG. 4 is a lateral cross section view taken on line A—A of FIG. 1;

FIG. 5 is a lateral cross section view taken on line 6—6 of FIG. 3 showing a preferred variation of the transverse contour of my reaction chamber and plugs;

FIG. 6 is a lateral cross section view taken on line 6—6 of FIG. 3 showing still another preferred variation of the transverse contour of my reaction chamber and plugs;

FIG. 7 is a longitudinal cross section view of another embodiment of my invention showing a section of a reactor tube and a plug adapted to aid in cleaning the interior surfaces of the reactor tube;

FIG. 8 is a longitudinal cross section view of still another embodiment of my invention showing a section of a reactor tube and an alternative adaptation of a plug.

Referring now to the drawings a first embodiment of my invention illustrated in FIG. 1 shows an elongated tubular reaction chamber 10 provided with a first reagent intake orifice 12 at a first end and spaced therefrom, a reacted reagent outflow orifice 14 at the second end.

A second reagent inflow orifice is provided at 16. Plugs in the form of spheres 18 are introduced into a hopper 20 where they roll to the throat of the hopper 22 and are restrained by the two spring loaded check valves 24 and 26. A mechanical plunger 28 periodically forces a single sphere 18 down into the reaction chamber 10. The double check valve arrangement 24 and 26 assures that only one sphere at a time will be introduced into the reaction chamber 10. The spheres 18 roll by reason of gravity down the reaction chamber 10 and are released through the orifice 30 at the lower end of the reaction chamber. The mixture of spent and reacted reagents and solvents leaves the reaction chamber 10 through the orifice 14 and is conveyed out of the reaction tube through drain 32. The spherical plugs 18 are caught in a conveyor chain 34 and are lifted again to the hopper 20. Such an embodiment of my invention as described above readily promotes increased yield by assuring a maximum amount of lateral mixing with a minimum amount of longitudinal mixing in the tube reactor. The efficiency of a chemical reaction is much increased by proper mixing of the reactants. Generally speaking, lateral mixing with a minimal amount of longitudinal turbulence will assure the most efficient mixing of reacting chemicals in a tubular reactor. An example of a system studied in the above described reactor was the preparation of n-dibutyl phthalate by reacting n-monobutyl phthalate and n-butanol in the presence of small amounts of sulphuric acid. It was found that the yield of n-dibutyl phthalate obtained from a model of my repeating reactor was substantially greater than that obtained in the same apparatus without the repeating feature.

The plugs 18 in the embodiment described above are spherical and have a diameter substantially equal to but always less than the interior of the reactor tube 10. The process of high transverse mixing with low longitudinal mixing in a tubular reactor may be accomplished when the plugs 18 are as small as three quarters of the diameter of the reactor tube and are practical from the point of view of free motion within the tube when their diameters are only a few hundredths of an inch less than the internal diameter of the reaction tube. The plugs inserted periodically into my reactor tube may have any suitable solid geometrical shape which partially obstructs the cross section of the reactor. Examples of such plug shapes are spheres, right circular cylinder, ellipsoid or other shapes approximating the cross section geometry of the reactor tube. The end faces of the plugs need not be planes or any other specific geometry. The plugs may be made from metal such as copper, steel, soft magnetic iron, stainless steel, ceramic materials, glazed clay, synthetic resins such as polyesters or polyurethanes or combinations of these and other materials in concentric layers. Moreover it is within the scope of my invention that not all of one kind of plug be utilized in a particular reactor tube, but alternate introduction of plugs having different geometrical and other properties is feasible and often useful. Plugs such as I have disclosed herein, in addition to their use in controlling the lateral and longitudinal mixing within a tubular reaction chamber, may be adapted to impart further conditions to the reaction chamber. For instance, plugs as utilized in my invention may be heated or cooled to further effect temperature control of the reactants; they may be coated with catalyst materials or even one of the initial reagents; they may be made of porous materials and adapted to slowly release catalyst or reagent during passage through the reactor tube; they may be provided with scraping edges to clean the surface of the reactor tube during passage therethrough; or they may be provided with magnetic iron cores such that movement of the plugs as well as pumping action of the reactants is possible with the application of magnetic fields exterior to the reactor tube which exert forces longitudinally in the reactor tube on the plugs.

It is also within the scope of my invention to include all manner of moving the plugs through the reactor tubes. My first embodiment disclosed above utilized gravity on rolling spheres within an inclined reactor tube. Numerous other methods of moving the plugs and reactants through the reactor tube are appropriate. I have disclosed above the feasibility of the utilization of moving magnetic fields acting upon magnetic iron plugs. The plugs may be fastened together with cables or chains, or they may be moved by the force of the reacting fluids which are being pumped through the tube. My invention is practical and readily adaptable to liquid-liquid reactions as disclosed in the embodiment of FIGURE 1; also it is readily adaptable to liquid-solid reactions wherein a slurry must be mixed and finally reactions of fluidized solids or solid with a gaseous reagent.

The manner of introduction of the plugs into the reactor and the particular characteristics of the plugs as illustrated in any given embodiment of my invention is merely incidental and not a limitation of my invention. For instance, while it is economical to do so, recycling of the plugs after passage through my reactor is not critical to the improved yields of reactions which are obtainable in my repeating reactor tube.

The frequency of insertion of plugs in my tubular reactor may be varied to fit the needs of the particular chemical system under consideration. The minimum rate of insertion of plugs into the reactor is that which insures a plurality of plugs in the reactor at any one instant; and the maximum rate of insertion is limited by physical contact between adjacent plugs to the exclusion of the reactants. A practical rate of insertion of plugs into the reactor is determined by examination of the economics of a particular chemical reaction. The purpose of my repeating reactor from the point of view of chemical reaction efficiency is to approximate a series of well-stirred kettle reactors while at the same time conferring the advantage of a continuous flow process. For those reactions requiring rapid mixing the plugs may be inserted as close together as one diameter or even one half diameter of the reaction tube; for those reactions not requiring continuous rapid stirring the plugs may be spaced as far apart as ten or more diameters of the reaction tube.

A second embodiment of my reactor is illustrated in FIG. 2 wherein spherical plugs 40 are connected by a continuous cable 42 through the diameters of the plugs to form continuously circulating spacer elements. A horizontal reaction tube 44 is provided with a reagent intake orifice 46 for introducing reagents into the reactor tube, an orifice 48 suitable for admitting the plugs 40, and at the down-stream end of the reactor tube 44, a reagent outlet orifice 50. A fourth orifice, 52, downstream from the reagent orifice 50 is provided for the removal of the circulating plugs 40.

Heat coils 54 are provided about the outer diameter of the reaction tube 44 with which the temperature of the reactants in the reaction tube 44 may be controlled. Further provision is made for supplying heat to the reactants or in some adaptations a heat sink by means of passing the plugs 40 through a temperature conditioning chamber 56 immediately prior to their introduction into the reaction chamber 44.

The plugs 40 connected together by short lengths of cable 42 are moved through the reaction chamber 44 by a positive drive mechanism comprising a rotating drum 58 having a crepe rubber coating over a scalloped surface 60. The concavities 61 in the drum are adapted to interact with the plugs 40 and give a positive drive force to the plugs and connecting cables. The drum 58 is mounted to a shaft 68 which is provided with a spring loaded mechanism, not shown in the illustrations, which maintains a substantially constant tension on the cables between the plugs. The plugs 40 are passed through a bath 62 to provide or activate a catalyst coating thereon. Idle pulleys 64 and 66 guide the plugs 40 mounted on the cable 42 around to the intake orifice 48 and back into the reaction tube 44.

Examples of catalysts which may be utilized in the chemical reactor device described above are vanadium pentoxide useful in the oxidation of naphthalene to phthalic anhydride, and mercurous chloride in the reaction of acetylene and hydrochloric acid to form vinyl chloride.

A third embodiment of my invention is illustrated in FIG. 3 wherein plugs 82 connected by lengths of chain 84 are positioned within the annular tube 80. A reagent intake orifice 86 is provided in the upper portion of the reactor tube 80, a reagent outlet 88 is proivded at a level below at a spaced distance from the intake orifice 86. The intake orifice 86 is connected to an intake manifold 90 and the outlet orifice 88 is connected to an outlet manifold 92. The plugs have a major dimension such that they will easily pass through the reaction chamber tube 80 but will substantially fill the cross sectional area of the reaction chamber at the point of their maximum dimensions. The plugs 82 are driven by a sprocket wheel 94 mounted on a drive shaft 96, the sprocket 94 is provided with suitable teeth 98 and suitable indentations 100 such that the plugs will pass properly when they go by the sprocket and yet the sprocket teeth will engage the chain lengths 84. The third embodiment of my invention is particularly suited to reactions involving high pressures and high temperatures. Moreover, it is particularly well suited to reactions wherein a considerable number of reactors are assembled and it is desired to use them in tandem. This is facilitated by the fact that an intake manifold 90 and an outflow manifold flow 92 can be readily attached to numerous reactors. The drive shaft 96 may be mounted to numerous reactors simultaneously. Still another advantage of this third embodiment illustrated in FIG. 3 of my invention is that considerably higher loads may be exerted on the chain 84 and the plugs 82 as they are circulated through the reactor tubes 80. This is useful in reactions such as polymerization or various other hydrocarbon reactions that occasion deposits forming on the walls of the reactors where those deposits quickly build up and form hard coatings.

FIG. 5 illustrates a cross sectional view of one variation of the reactor tube 80a and a plug 82a having a hexagon shape. This hexagonal or other polygonal shape facilitates greater ratio of surface to volume, therefore better control of heat of the reacting solution and also it allows for better control of deposits on the interior walls of the reactor tube. FIG. 6 illustrates still another variation of the reactor tube in plugs. FIG. 6 is a cross section through a variation of the embodiment illustrated in FIG. 3 on line 6—6. The stellar shaped plug and reactor tube 80b, plug 82b exhibits a large ratio of surface to volume and therefore permits better control of the local temperature of the reacting solution.

Various other modifications may be made in the plugs which will confer extra advantageous characteristics to my repeater reactor. For instance, referring now to FIG. 7, which shows a longitudinal cross section view of a plug 106 in a reactor tube modified to provide on its leading surface scraping edges 108 which would clean the tube of fouling deposits. FIG. 8 shows a longitudinal cross section view of a plug 110 having an elongated section which provides for greater heat storage capacity in the case of a metal or glass plug; or as in the case shown in the illustration of a porous ceramic plug having increased catalyst storage capacity. In addition to the catalyst storage feature thet plug 110 is provided with roughened surfaces to promote greater turbulence in the fluids in contact with its surfaces.

The foregoing embodiments of apparatus which may be utilized to carry out the method of my invention are intended merely as illustrative and variations of this apparatus will be obvious to those skilled in the art. The scope of my invention is set forth in the following claim.

What is claimed is:

A chemical reactor comprising a tube, means for introducing chemical reagents into the tube, plugs adapted to freely fit within the tube and effecting isolation of the tube on each side thereof, means for introducing the plugs at time intervals concurrently with the chemical reagent into the tube, whereby the reagents move along the tube in discrete batches separated by the plugs moving concurrently with the reactants wherewith longitudinal mixing of the chemical reagents in the tube is lessened and transverse mixing within the tube is increased.

References Cited in the file of this patent
UNITED STATES PATENTS
2,370,950    Gibb et al. _____ Mar. 6, 1945

UNITED STATES PATENT OFFICE
CERTIFICATE OF CORRECTION

Patent No. 3,148,035　　　　　　　　　　　September 8, 1964

George C. Szego

It is hereby certified that error appears in the above numbered patent requiring correction and that the said Letters Patent should read as corrected below.

Column 2, following line 19, add the following paragraph:

My invention is, briefly, a chemical reactor comprising an elongated tubular reaction chamber having a reagent intake orifice and spaced therefrom an outflow orifice, plugs adapted to freely fit within the chamber having outside cross section dimensions substantially equivalent to the internal cross section dimensions of the tubular reaction chamber, means for positioning the plugs within the reaction chamber at time intervals concurrently with the inflowing reagent, means for passing the plugs through the tubular reaction chamber and means for separating the plugs from the reacted fluids.

column 4, line 72, for "proivded" read -- provided --; column 6, line 15, for "thet" read -- the --.

Signed and sealed this 27th day of April 1965.

(SEAL)
Attest:

ERNEST W. SWIDER　　　　　　　　　　　EDWARD J. BRENNER
Attesting Officer　　　　　　　　　　　Commissioner of Patents